(12) United States Patent
Nakajima

(10) Patent No.: US 8,496,339 B2
(45) Date of Patent: Jul. 30, 2013

(54) TRANSPARENT, WAVELENGTH-SELECTIVE RETROREFLECTOR

(75) Inventor: Toshitaka Nakajima, Yamagata-pref (JP)

(73) Assignee: 3M Innovative Properties Company, St. Paul, MN (US)

( * ) Notice: Subject to any disclaimer, the term of this patent is extended or adjusted under 35 U.S.C. 154(b) by 911 days.

(21) Appl. No.: 11/993,331

(22) PCT Filed: Jun. 26, 2006

(86) PCT No.: PCT/US2006/024738
§ 371 (c)(1), (2), (4) Date: Jul. 22, 2010

(87) PCT Pub. No.: WO2007/005357
PCT Pub. Date: Jan. 11, 2007

(65) Prior Publication Data
US 2010/0277801 A1    Nov. 4, 2010

(30) Foreign Application Priority Data
Jun. 29, 2005    (JP) .................................. 2005-190166

(51) Int. Cl.
*G02B 5/122*    (2006.01)

(52) U.S. Cl.
USPC ........................................................ 359/530

(58) Field of Classification Search
USPC ................................................ 359/529, 530
See application file for complete search history.

(56) References Cited

U.S. PATENT DOCUMENTS

| | | |
|---|---|---|
| 3,712,706 A | 1/1973 | Stamm |
| 4,181,752 A | 1/1980 | Martens et al. |
| 4,202,600 A | 5/1980 | Burke et al. |
| 4,243,618 A | 1/1981 | Van Arnam |
| 4,329,384 A | 5/1982 | Vesley et al. |
| 4,330,590 A | 5/1982 | Vesley |
| 4,588,258 A | 5/1986 | Hoopman |
| 4,737,559 A | 4/1988 | Kellen et al. |
| 4,775,219 A | 10/1988 | Appeldorn et al. |
| 4,938,563 A | 7/1990 | Nelson et al. |
| 5,637,646 A | 6/1997 | Ellis |
| 6,157,486 A | 12/2000 | Benson, Jr. et al. |
| 6,280,822 B1 * | 8/2001 | Smith et al. ................... 359/529 |
| 6,350,034 B1 | 2/2002 | Fleming et al. |
| 2001/0033906 A1 | 10/2001 | Smith et al. |
| 2005/0185279 A1 | 8/2005 | Mullen et al. |

FOREIGN PATENT DOCUMENTS

| | | |
|---|---|---|
| EP | 0555847 | 8/1993 |
| JP | 5346767 | 12/1993 |
| JP | 7178853 | 7/1995 |

(Continued)

*Primary Examiner* — Euncha Cherry (57) ABSTRACT

A transparent wavelength-selective retroreflector (100) that retroreflects light within a specific wavelength range and is transparent to visible light. A transparent wavelength-selective retroreflector allows visible light to pass therethrough and selectively retroreflects light within a specific wavelength range. One preferred embodiment of a transparent, wavelength-selective retroreflector includes an optical structure layer (101) that is made of a light transmissible material and a wavelength selective reflective layer (102). At least one of the front or rear surfaces includes a cube corner structure, such as cube-corner type trigonal pyramids, cube-corner type cavities, cube-corner type trigonal pyramids with reflective layers, cube-corner type cavities with reflective layers, and the like.

13 Claims, 3 Drawing Sheets

FOREIGN PATENT DOCUMENTS

| | | |
|---|---|---|
| JP | 9506837 | 7/1997 |
| JP | 11281816 | 10/1999 |
| JP | 2000-293105 | 10/2000 |
| JP | 2002-509279 | 3/2002 |
| JP | 2002-535691 | 10/2002 |
| WO | WO 03/068868 | 8/2003 |

* cited by examiner

TRANSPARENT, WAVELENGTH-SELECTIVE RETROREFLECTOR

TECHNICAL FIELD

The present invention relates to retroreflectors, and particularly to a transparent wavelength-selective retroreflector that selectively reflects light within a specific wavelength range while permitting visible light to pass through the retroreflector.

BACKGROUND

Retroreflectors reflect incident light back to the light source. Retroreflectors can be used in signs, such as, for example, construction signs and signposts; in noticeable tape, such as, for example, tape for an automobile or motorcycle; in clothing; in safety materials, such as, for example, life-saving devices; in signboard markings; in reflective boards for visible and laser light; and in infrared light reflecting sensors. Retroreflectors including cube corners are often considered far superior in retroreflective efficiency as compared to retroreflectors including glass beads. Consequently, the use of cube corner retroreflectors is increasing annually.

Cube corner retroreflective sheeting generally fall into two categories: (1) sheetings having a retroreflective structure on a front surface on which light is incident and (2) sheetings having a retroreflective structure on a rear surface. Most commercially available cube-corner retroreflective sheetings are of the latter type. Light is incident on the planar front surface, passes through the thickness of the body layer, and is retroreflected by the retroreflective structure of the rear surface to return to the front surface. In some cases, a reflective coating such as aluminum is applied to the rear structured surface, followed by an adhesive layer that, to some extent, covers and conforms to the shape of the structured surface. However, a reflective coating is not required as long as a clean air interface can be maintained at the structured surface, in which case reflections occur by total internal reflection.

The cube-corner retroreflective sheeting described in Japanese Patent Kohyo Publication 2002-535691 and U.S. Pat. No. 6,280,822 includes a retroreflective structure on its front surface. By laminating a thin metal film on the structured front surface, it is possible to enhance the reflectance of the surface. Incident light is reflected on plural surfaces forming the retroreflective structure, and does not penetrate the body layer. The retroreflective structure is formed by the arrangement of multiple cube corner structures, such as, for example, cube-corner type trigonal pyramids, cube-corner type cavities, or both. "Cube-corner type trigonal pyramid" means a projecting portion of a trihedral prism form having three exposed planes. "Cube-corner type cavity" means a recessed portion of a trihedral prism form similar to that mentioned above.

Japanese Patent Kokai Publication H5 (1993)-346767 describes an infrared light reflecting cube-corner sheeting. In this cube-corner sheeting, the polymer that forms the cube-corners contains a colorant that is transparent for infrared light but is substantially opaque for visible light. Such cube-corner sheeting can retroreflect incident infrared light while absorbing visible light. Thus when the cube-corner sheet is used as an infrared reflective board, any color or image underneath the sheeting cannot be seen. This type of sheeting, therefore, is inadequate for use where design or aesthetics are important.

Japanese Patent Kohyo Publication 2002-509276 and U.S. Pat. No. 6,157,486 describe a wavelength-selective retroreflector. In this retroreflector, a multilayered reflective film having wavelength-selective transmissibility is disposed on the surface of a retroreflective article. The reflector only retroreflects light within a specific wavelength range, as determined by the multilayered reflective film chosen, and specularly reflects all other light incident on the reflector. The selective retroreflection of infrared light and the specular reflection of visible light causes the retroreflector to exhibit a mirror-like appearance. Consequently, colors or images underneath the retroreflector cannot be seen.

SUMMARY

The inventors of the present application solved the above-mentioned problems by creating a transparent, wavelength-selective retroreflector capable of retroreflecting light within a specific wavelength range while being transparent to visible light. The transparent, wavelength-selective retroreflector allows visible light to pass therethrough and selectively retroreflects light within a specific wavelength range.

One preferred embodiment of a transparent, wavelength-selective retroreflector includes an optical structure layer that is made of a light transmissible material. The optical structure layer includes first and second major surfaces, which may also be referred to as front and rear surfaces. At least one of the front or rear surface includes a cube corner structure such as, for example, cube-corner type trigonal pyramids, cube-corner type cavities, cube-corner type trigonal pyramids with reflective layers, cube-corner type cavities with reflective layers, and the like.

Another preferred embodiment of a transparent wavelength-selective retroreflector includes (1) an optical structure layer made of a light transmissible material and (2) a wavelength-selective reflective layer that allows visible light to pass therethrough and selectively reflects light within a specific wavelength range. The optical structure layer includes a first major surface and a second major surface, which may also be referred to as front and rear surfaces. The front surface includes a structure having multiple cube-corner type cavities and the rear surface is substantially flat. The wavelength-selective reflective layer is disposed on the front surface of the optical structure layer.

Another preferred embodiment of a transparent wavelength-selective retroreflector includes (1) an optical structure layer made of a light transmissible material; and (2) a wavelength-selective reflective layer that allows visible light to pass therethrough and that selectively reflects light within a specific wavelength range. The optical structure layer includes a first major surface and a second major surface, which may also be referred to as front and rear surfaces. The front surface is substantially flat, and the rear surface includes a cube-corner type retroreflective structure. The wavelength-selective reflective layer has a first major surface and a second major surface. The first major surface is disposed on the front surface of the optical structure layer, and a light-transmissible resin layer may be disposed on second major surface of the wavelength-selective reflective layer.

Some preferred embodiments of a transparent wavelength-selective retroreflector are transparent such that a color or image underlying the retroreflector can be seen therethrough. The retroreflector, therefore, can have an aesthetic effect on the appearance of the place where the retroreflector is installed. Accordingly, the retroreflector can be installed in a place where design or aesthetics are important. In addition, some preferred embodiments of the retroreflector permit light to pass therethrough. Thus, even when the retroreflector is disposed on a lighting indicator or another type of indicators, the retroreflector does not adversely affect the performance of the indicator.

DETAILED DESCRIPTION

Figure 1:
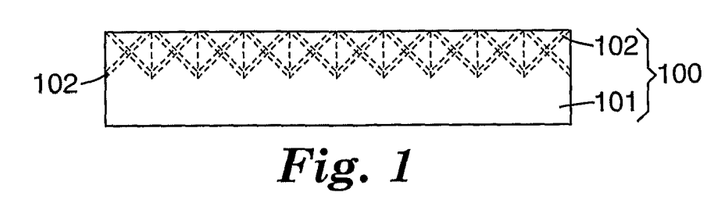
FIG. 1 is an elevation showing one embodiment of a transparent, wavelength-selective retroreflector.

FIG. 1 is an elevation showing one embodiment of a transparent wavelength-selective retroreflector. A transparent wavelength-selective retroreflector 100 has a first major surface and a second major surface, which may also be referred to as front and rear surfaces. The retroreflector has an optical structure layer 101 having cube-corner type cavities and a wavelength-selective reflective layer 102 formed along the cube-corner type cavities. In this embodiment, the front surface is the surface of the retroreflector on which light is incident. In this embodiment, the rear surface of the optical structure layer 101 may be substantially flat or alternatively may be uneven.

The term 'retroreflective structure' is meant to include any arrangement, constituent of optical shape, optical shape, and/or structure capable of retroreflecting incident light. The retroreflective structure includes, for example, cube-corner type trigonal pyramids, cube-corner type cavities, cube-corner type trigonal pyramids with reflective layers, cube-corner type cavities with reflective layers, and the like. Optical structure layer 101 depicted in FIG. 1 has a retroreflective structure of cube-corner type cavities with a wavelength-selective reflective layer.

Figure 2:
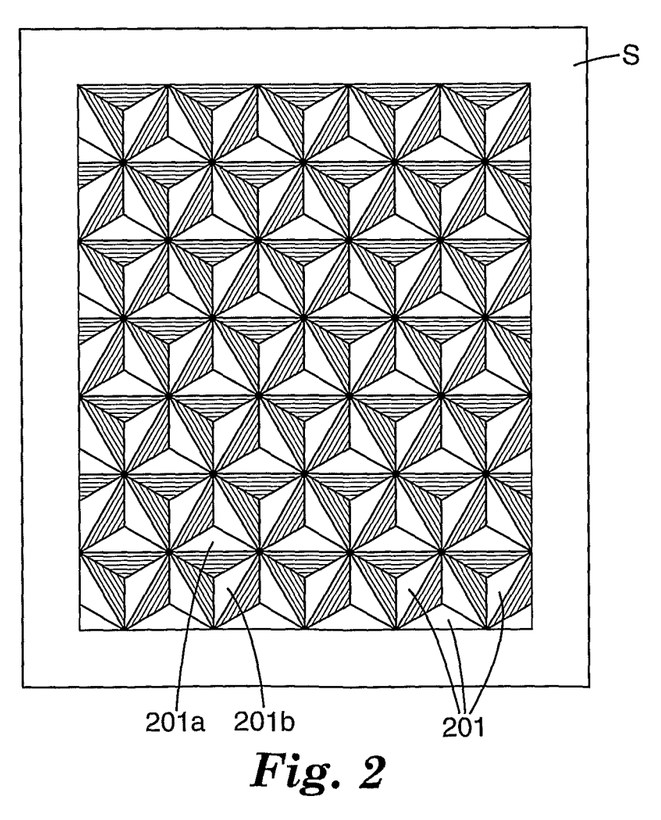
FIG. 2 is a plan view showing an example of a cube-corner type retroreflective structure seen from the front surface of the optical structure layer.

FIG. 2 is a plan view showing an example of a cube-corner type retroreflective structure seen from the front surface of optical structure layer 101. This retroreflective structure is composed of plural (or multiple) cube-corner type cavities 201 arranged in a closest packed manner on a common base surface S. In the embodiment shown in FIG. 2, base surface S accords with the front surface of optical structure layer 101. Cube-corner type cavities 201a and 201b are adjacent to one another and are in the relationship of concave-concave on the basis of the base surface S. This cube-corner type retroreflective structure can retroreflect light that has impinged on the front surface.

Figure 5:
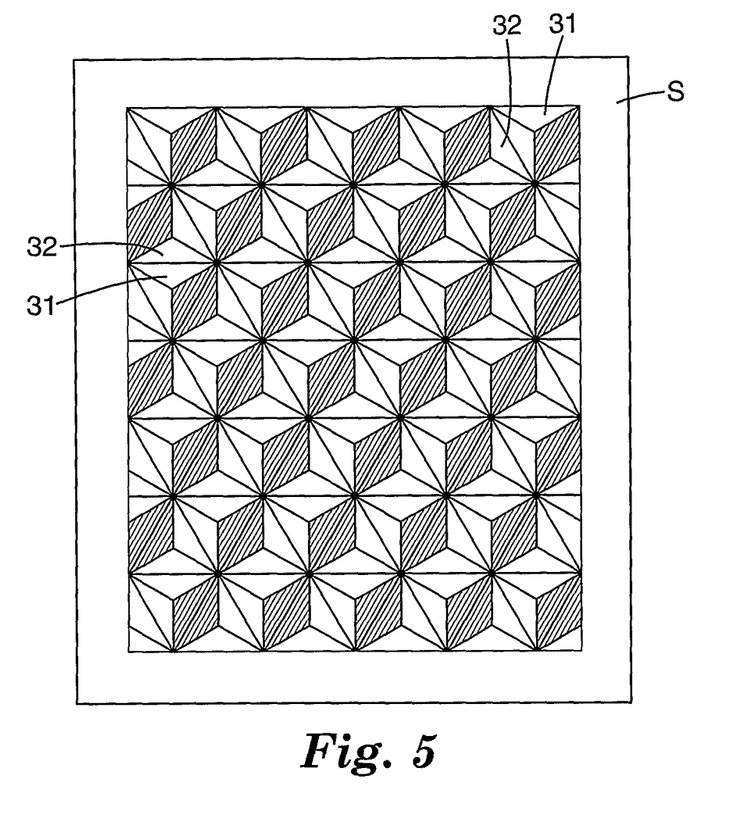
FIG. 5 is a plan view showing an example of a cube-corner type retroreflective structure seen from the rear surface of the optical structure layer.

Alternatively, a cube-corner type retroreflective structure may be composed of multiple cube-corner type trigonal pyramids and cube-corner type cavities which are arranged in a closest packed manner on a common base surface wherein adjacent cube-corners are in the relationship of concave-convex on the basis of the base surface. An example of such a retroreflective structure is shown in FIG. 5.

Cube corner structures impart retroreflectivity to an object. When the object is made of a transparent resin or the like, reflection of light is caused by total reflection. In total reflection, reflection occurs in all the wavelength ranges including the ultraviolet range, the visible range, and the infrared range. An exemplary way to retroreflect light of a specific wavelength involves (1) making light having a wavelength other than the specific one be absorbed undesired and (2) reflecting the undesired light in a direction other than the retroreflective direction.

In some preferred embodiments of a transparent, wavelength-selective retroreflector, a resin or glass that transmits light of the overall wavelength range is used to form cube-corner type cavities. The resin or glass structure itself has no retroreflectivity and transmits light of almost overall wavelength range. A reflective layer capable of reflecting light within a specific wavelength range is then formed on the cube-corner type cavities. The resulting transparent, wavelength-selective retroreflector is capable of retroreflecting light of a specific wavelength range while transmitting other light.

For this purpose, when the side on which light is incident is defined as a front surface and the opposed side across the reflective layer is defined as a rear surface, materials which do not cause total reflection in the absence of the reflective layer are used as the materials of the front surface and the rear surface. Snell's law is represented by the following equation:

$$n1 \sin \theta 1 = n2 \sin \theta 2$$

where n1 is the refractive index of the medium in the incident angle side and n2 is the refractive index of the medium in the refraction angle side.

A combination of materials is selected which have refractive indices n1 and n2 which do not satisfy the total refraction condition represented by the following equation:

$$\sin \theta c = n2/n1$$

where n1 and n2 have the same meanings as those defined above and θc is a critical angle. In this case, air, water, and the like may be used as the medium material.

Figures 3, 4:
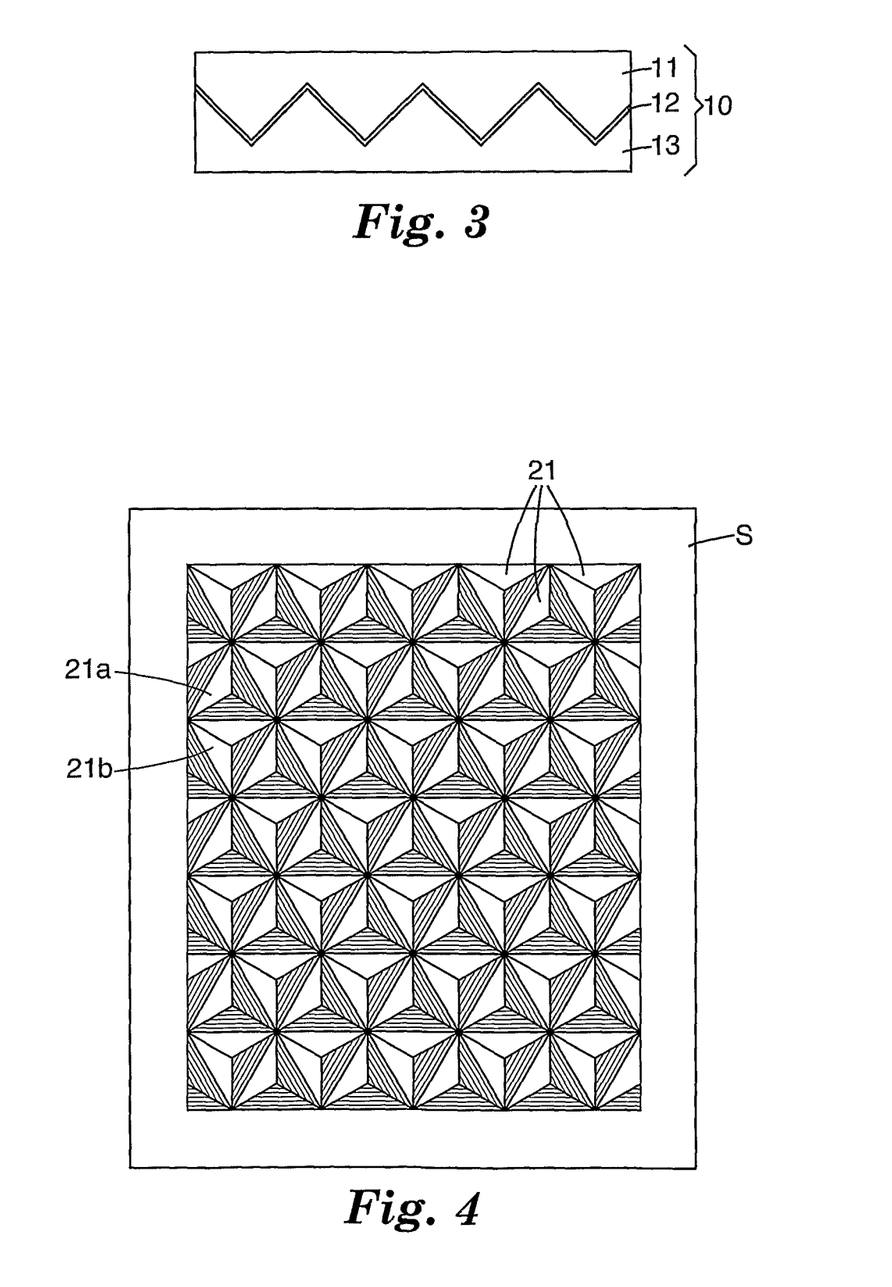
FIG. 3 is an elevation showing another embodiment of a transparent, wavelength-selective retroreflector.
FIG. 4 is a plan view showing an example of a cube-corner type retroreflective structure seen from the rear surface of the optical structure layer.

FIG. 3 is an elevation showing another embodiment of a transparent wavelength-selective retroreflector 10. Retroreflector 10 includes an optical structure layer 11 having a first major surface (front surface) and a second major surface (rear surface). The rear surface of optical structure layer 11 includes a cube-corner type structure, and optical structure layer 11 exhibits retroreflectivity. A wavelength-selective reflective layer 12 is positioned along the rear surface or cube-corner type structure of optical structure layer 11, and a light-transmissible resin layer 13 covering is positioned adjacent at least a portion of wavelength-selective reflective layer 12.

As shown in FIG. 3, optical structure layer 11 has a substantially flat front surface, however the front surface may be convex or concave as long the incidence of the light is not disturbed. In this embodiment, the front surface is the surface of the retroreflector on which light is incident. The rear surface of the optical structure layer 11 has a retroreflective structure. The term 'retroreflective structure' is meant to include any arrangement, constituent of optical shape, optical shape, and/or structure capable of retroreflecting incident light. In some instances, retroreflective structure may be referred to together with or may include the wavelength-selective reflective layer 12. Optical structure layer 11 depicted in FIG. 3 has a cube-corner type retroreflective structure on its rear surface.

FIG. 4 is a plan view showing an example of a cube-corner type retroreflective structure seen from the rear surface of optical structure layer 11. This retroreflective structure is composed of plural (or multiple) cube-corner type trigonal pyramids 21 that are arranged in a closest packed manner on a common base surface S. Adjacent cube-corner type trigonal pyramids 21a and 21b are in the relationship of convex-convex on the basis of the base surface S. This cube-corner type retroreflective structure can retroreflect light impinging on the front surface.

Cube-corner type trigonal pyramids each include a trihedral prism having three exposed planes. The adjacent planes are substantially perpendicular at an angular point (similar to a room corner). The prism may have a vertical angle of 90°, but this angle is not critical because the cube-corner trigonal pyramid may have any shape that effects retroreflectivity when it is formed on one surface of the optical structure layer.

An exemplary cube-corner type trigonal pyramid having a vertical angle of other than 90° is, for example, described in U.S. Pat. No. 4,775,219. Also, an angular point of the cube-corner type trigonal pyramid may be placed aslant to a center of the trigonal pyramid, as described in U.S. Pat. No. 4,588,258. The shape of the trigonal pyramid is not limited to a geometric shape of a specific cube-corner. However, among well-known cube-corner constructions, preferred examples include cube-corner sheet material described in, for example, U.S. Pat. Nos. 4,938,563; 4,775,219; 4,243,618; 4,202,600; 3,712,706; and 4,588,258. These examples exhibit retroreflectivity of wide angles over multiple visible planes.

The size of the cube-corner type trigonal pyramid is not limited. An exemplary trigonal pyramid is formed so as to have sides, namely ridge lines, with a length of, for example, 50 µm to 5 mm, preferably 100 µm to 2.5 mm, more preferably 250 µm to 1 mm. A side having a length of less than 50 µm can make it difficult to produce a reflector, and a side length of more than 5 mm can make it difficult to handle a reflector during its installation.

FIG. 5 is a plan view showing a rear surface of an optical structure layer in another embodiment of a transparent, wavelength-selective retroreflector. This cube-corner type retroreflective structure is composed of plural (or multiple) cube-corner type trigonal pyramids 31 and cube-corner type cavities 32 which are arranged in a closest packed manner on a common base surface S. Adjacent cube-corner type trigonal pyramid 31 and cube-corner type cavity 32 are in the relationship of concave-convex on the basis of the base surface.

A cube-corner type cavity may have a shape comprising the inversion of a cube-corner type trigonal pyramid. In such an instance, the dimensions of the cube-corner type cavity is about the same as those of the cube-corner type trigonal pyramid except the ridge lines are expressed as valley lines. A cube-corner type retroreflective structure formed in this way is the same in shape when viewed from the front surface and from the rear surface. As a result, this cube-corner type both-side retroreflective structure may exhibit retroreflectivity on both the front surface and the rear surface.

In another preferred embodiment, one cube-corner type trigonal pyramid and three cube-corner type cavities adjacent thereto together form a full cube-corner. The term 'full cube-corner' includes, but is not limited to, a structure in which three planes that form one corner also form a hexahedron shape. A cube-corner with a shape illustratively shown in FIG. 5 is a full cube-corner.

The optical structure layer may be formed of a light transmissible polymer, or the like. The light transmissible polymer preferably transmits at least 70% of the intensity of the incident light of a given wavelength. The light transmissible polymer more preferably has a light transmittance of not less than 80%, furthermore preferably has a light transmittance of not less than 90%.

Wavelength-selective reflective layers 102 and 12 are preferably films or coatings that allow visible light to pass therethrough and selectively reflect some light within a specific wavelength range (other than visible light). The inventors of the present application recognized that it is possible to retroreflect light within a specific wavelength range while maintaining a transparent appearance by allowing visible light to pass through and selectively reflecting light within the specific wavelength range (other than visible light).

The light that the wavelength-selective reflective layers reflect (i.e., the light intended to be retroreflected) is preferably light having a wavelength of a certain range. A preferred reflection wavelength range selected from a ultraviolet band-range has a wavelength between about 110 nm and about 400 nm; a near infrared band-range has a wavelength between about 750 nm and about 3000 nm; and a normal infrared band-range has a wavelength between about 3000 nm and about 25000 nm. A band-range having a wavelength of greater than 25000 nm may also be selected. More than one wavelength ranges may be selected. For example, a plurality of reflective wavelength band-ranges, such as two or more wavelength ranges of a reflective wavelength band-range of between about 110 nm and about 310 nm and one or more reflective wavelength band-ranges between about 1200 nm to about 1400 nm may be selected.

When selectively retroreflecting light having a wavelength within the infrared range, a preferred wavelength-selective reflective layer has a reflection wavelength range selected from the wavelength range between about 750 nm to about 15000 nm.

A conventionally known wavelength-selective reflective layer may be used if it is a layer capable of transmitting visible light and selectively reflecting light within an intended wavelength range. For example, a wavelength-selective reflective layer including a dielectric reflective layer may be used. The dielectric reflective layer may be composed of a multilayered article or a multilayered film including plural dielectric layers. The term "dielectric reflective layer" used herein is defined as a layer composed of a reflector which includes plural light transmissible dielectric layers piled together in intimate contact wherein the thickness and the refractive index of each layer are determined so that the relationship therebetween has the above-mentioned wavelength selectivity (where wavelength selectivity refers to the ability of the layer to transmit light within a specific wavelength range and reflect light outside the wavelength range). In a dielectric reflective layer, dielectric layers adjacent to each other have differing refractive indices. In one preferred embodiment, a dielectric layer with a relatively low refractive index is disposed on each side of a dielectric layer with a relatively high refractive index and a dielectric layer with a relatively high refractive index is disposed on each side of a dielectric layer with a relatively low refractive index. By effectively utilizing reflection occurring in the interface between dielectric layers having different refractive indices, the dielectric reflective layers exert wavelength selectivity such that light within a desired wavelength range is transmitted and light within a undesired wavelength range is reflected.

Wavelength selectivity utilizes the principle of wavelength-selective reflection. This principle states that the product of the thickness and the refractive index of a dielectric layer is a quarter of the wavelength of the light incident on the layer, and the refractive index of the layer is higher or lower than those of both the materials. Thus the light beam(s) reflected on two interfaces between both the materials and the layer become in phase to reinforce each other.

The dielectric reflection principle is well-known and is described in detail in, for example, Japanese Patent Kohyo Publication H9 (1997)-506837, Japanese Patent Kokai Publication H11 (1999)-281816, and Japanese Patent Kohyo Publication 2002-509279.

A polymer may be used as the dielectric reflective layer. Use of a polymer in the dielectric layer may be preferred where the processability is stressed. In such a case, the dielectric reflective layer is composed of a dielectric reflective film that includes a combination of a first group of dielectric reflective layer unit composed of plural layers of a first polymer and a second group of dielectric reflective layer unit composed of plural layers of a second polymer different in refractive index from the first polymer. In such a dielectric reflective film, the layers of the first polymer and the layers of the second polymer are laminated alternately, so that the first and second groups of dielectric reflective layer units are combined. At least one of the first and second groups of dielectric reflective layer units includes a quarter wave layer having a product (n·d) of the thickness (d, in nm) and the refractive index (n) which is equal to a quarter of the wavelength of the light reflected. For example, for efficiently increasing the reflectance of the light within the wavelength range of from 800 to 1200 nm, the product (n·d) of the quarter wave layer is designed to be within the range of 200 to 300 nm.

Such a design can make it possible to efficiently increase the reflectance of light within a desired wavelength range (reflection wavelength range) while increasing the transmittance of light in a wavelength range(s) other than the reflection wavelength range. In one example, visible light of up to 800 nm can be reflected and infrared light over 1200 nm can be transmitted. Such a dielectric reflective layer can be formed by known methods such as (a) a method in which a dielectric layer is formed on a transparent polymer film by multilayer coating and (b) a method in which a multilayered film is formed by coextrusion using a dielectric as a polymeric material.

Materials other than polymers may also preferably be used as the dielectric reflective layer. Exemplary non-polymeric materials include lithium fluoride (LiF), magnesium fluoride ($MgF_2$), calcium fluoride ($CaF_2$), barium fluoride ($BaF_2$), lanthanum fluoride ($LaF_3$), silicon dioxide ($SiO_2$), aluminum dioxide ($Al_2O_3$), titanium oxide ($TiO_2$), silicon nitride, sodium chloride (NaCl), potassium chloride (KCl), potassium bromide (KBr), zinc sulfide (ZnS), zirconium oxide ($ZrO_2$) and zinc selenide (ZnSe). When non-polymeric materials are used, the dielectric reflective layer may be bound by physical or chemical deposition techniques, such as vacuum evaporation, sputtering and chemical vapor deposition (CVD), depending upon the type of dielectric reflective layer desired.

A transparent electroconductive film may be used as the wavelength-selective reflective layer. The films typically reflect light of wavelengths longer than a specific wavelength (this may be referred to as plasma reflection). One exemplary transparent electroconductive film is a thin film of a metal compound or combination of compounds, such as, for example, tin oxide, zinc oxide and indium tin oxide (ITO).

The wavelength-selective reflective layer receives light, reflects the light within a reflection wavelength range in a predetermined ratio, and transmits, in a predetermined ratio, light within a transmission wavelength range outside the reflection wavelength range. The reflectance of the light within the reflection wavelength range is preferably at least 40%, more preferably at least 50%, and most preferably at least 60%. The transmittance of the light within the transmission wavelength range is preferably at least 40%, and is more preferably at least 50%. It may be particularly desirable for the wavelength-selective reflective layer to have a reflectance of at least 50% for light having a wavelength of between about 940 nm and about 1100 nm.

The light transmissible resin layer 13 preferably includes a resin having a refractive index almost equal to that of the optical structure layer 11. When a retroreflective structure is filled with such a resin, visible light that has passed through the wavelength-selective reflective layer can pass through light transmissible resin layer 13. It, therefore, becomes possible to make the retroreflector have a transparent appearance. It may be preferable to use the same resin in light transmissible resin layer 13 and optical structure layer 11.

A layer of filler or adhesive may be disposed between optical structure layer 11 and wavelength-selective reflective layer 12 or be disposed between wavelength-selective reflective layer 12 and light transmissible resin layer 13. Where filler or adhesive is used, the filler or adhesive preferably includes a material that has a refractive index that is approximately equal to that of optical structure layer 11.

When two retroreflective structures each have a full cube-corner shape (for example, a structure as shown in FIG. 5) and are stacked such that the cavities of one structure are placed adjacent to the projections of the other structure, the cavities and projections fit together such that there is substantially no space therebetween. Thus when the retroreflective structure of an optical structure layer has a full cube-corner shape, it is possible to use another optical structure layer as a light transmissible resin layer by stacking it on a wavelength-selective reflective layer such that the cavities and projections, respectively, of each structure fit together and substantially eliminate or minimize the space therebetween. In a transparent wavelength-selective retroreflector constituted in this manner, the distinction between the front surface and the rear surface is minimized or eliminated. In other words, the transparent wavelength-selective retroreflector can retroreflect light which is incident on either of the major surfaces of the retroreflector if the light has a wavelength within a range where light is reflected back by the wavelength-selective reflective layer.

The light transmissible resin layer may also be formed from a resin composition. Preferred resin compositions are those that can flow along an exposed surface of a wavelength-selective reflective layer at room temperature and that can provide a required refractive index after their solidification. It is further desirable that the resin composition exhibit little or no shrinkage upon curing such that it maintains intimate contact with the recessed faces of the structured surface.

A preferred class of resin compositions includes acrylic polymers including those that may be pressure-sensitive adhesives at room temperature and those that are heat-activated adhesives that are substantially non-tacky at room temperature but become tacky at higher temperatures. Some preferred acrylic polymers and copolymers are formed from acrylic or methacrylic acid esters of non-tertiary alkyl alcohols. The acrylic and methacrylic esters typically have a glass transition temperature below about 0° C. Examples of such monomers include n-butyl acrylate, isooctyl acrylate, 2-ethylhexyl acrylate, isononyl acrylate, isodecyl acrylate, decyl acrylate, lauryl acrylate, hexyl acrylate, and octadecyl acrylate, and/or combinations thereof and the like. Such monomeric acrylic or methacrylic esters are known in the art, and many are commercially available.

The acrylic polymers typically include a copolymerizable monomer having a glass transition temperature above 0° C. to enhance shear strength. Suitable copolymerizable monomers include acrylic acid, methacrylic acid, itaconic acid, n-vinyl pyrrolidine, n-vinyl caprolactam, substituted acrylamides such as N,N-dimethylacrylamide, N-vinyl-2-pyrrolidone, N-vinyl caprolactam, acrylonitrile, isobornyl acrylate, tetrahydrofurfuryl acrylate, glycidyl acrylate, 2-phenoxyethylacrylate, benzylacrylate, acrylonitrile, methacrylonitrile, and/or combinations thereof.

The ratio of acrylate monomer to copolymerizable monomer can vary from 100 to about 30 parts of acrylate to 0 to 70 parts of copolymerizable monomer. The specific monomer ratios are selected for the desired end use properties.

The acrylic polymers may be prepared by emulsion polymerization, bulk polymerization, solvent polymerization, and the like, using appropriate polymerization initiators. Suitable resin compositions for use in the transparent, wavelength-selective retroreflector are described in, for example, U.S. Pat. Nos. 5,637,646; 4,181,752; and Re. 24,906, all of which are incorporated herein by reference.

Various other materials may be added to tailor the characteristics of the polymer for the end use. Some exemplary materials include colorants, fluorescent dyes or pigments, chain transfer agents, plasticizers, tackifiers, antioxidants, stabilizers, cross-linking agents, and solvents.

The resin composition is preferably cross-linked to provide higher shear strength. In order to maintain optical performance, the entrapped gas or voids are preferably allowed to escape or collapse before the resin composition is cross-linked. Suitable cross-linking agents include those that are free radically copolymerizable with the acrylate monomers, and those that may be activated by radiation, such as ultraviolet light. Additionally, cross-linking may be effected in the absence of cross-linking agents by, for example, an electron beam.

When the resin composition is applied to the sheeting in substantially polymeric form, e.g., as a hot melt coating, entrapped gas is allowed to diffuse before cross-linking. It is believed that the diffusing gas may diffuse into the resin composition. Examples of cross-linking agents suitable for use in the transparent, wavelength-selective retroreflector include free-radically copolymerizable crosslinking agents such as, for example, 4-acryloxybenzophenone, para-acryloxyethoxybenophenone, and para-N-(methacryloxyethyl) carbamoylethoxybenzophenone. Copolymerizable chemical cross linking agents are preferably included in an amount of about 0% to about 2%, and more preferably in an amount of about 0.025% to about 0.5%, based on the total weight of monomer(s). Other useful copolymerizable cross-linking agents are described in U.S. Pat. No. 4,737,559 (Kellen et al.). Cross-linking may be effected by ultraviolet light.

Alternatively, a resin composition may be polymerized in situ on the structured surface of the sheeting by coating a monomeric or oligomeric composition onto the sheeting and polymerizing the composition with heat or radiation. In this case, the composition has a viscosity that is sufficiently low prior to polymerization that any gas such as air will diffuse out of the composition prior to polymerization, and the composition will flow rapidly and will thus easily fill the recessed portions of the structured surface. Suitable cross-linking agents include those mentioned above as well as materials that cross-link during the polymerization process. Examples of these types of cross-linking agents include multi-functional acrylates, such as, for example, 1,6 hexanedioldiacrylate and trimethylolpropanetriacrylate, and substituted triazines such as those described in U.S. Pat. Nos. 4,330,590 and 4,329,384. These cross-linking agents may be used in amounts between about 0.0001% to about 0.005% based on the weight of the monomers.

The resin composition may be applied to the sheeting by any suitable method. For example, the resin composition can be dispersed in a solvent or an emulsion, coated onto the wavelength-selective reflective layer, and the sheeting can be dried to cause the solvent or water to leave the resin. Alternatively, the resin composition may be hot-melt-coated onto the sheeting using known equipment, such as, for example, extrusion coaters, rotary rod die coaters, and the like. Solvent-free processes may be preferred because they eliminate environmental concerns associated with solvents and they minimize the formation of bubbles during drying of a solvent-containing composition.

Another embodiment of a preferred transparent wavelength-selective retroreflector is a transparent wavelength-selective retroreflector comprising a light-transmissible substrate having a uniform thickness and formed in a shape that provides or enhances the retroreflector's retroreflectivity. The retroreflector includes a wavelength-selective reflective layer that allows visible light to pass therethrough and selectively reflects light within a specific wavelength range. The wavelength-selective reflective layer is preferably disposed on the front surface or rear surface of the plate-like substrate.

The structures shown in FIGS. 4 and 5 are exemplary shapes that exhibit retroreflectivity. The structure shown in FIG. 2 is a shape that exhibits retroreflectivity when it is combined with one or more reflective layers. The light transmissible plate-like substrate may be formed from the above-mentioned light transmissible polymer or the like.

Another preferred embodiment of a transparent wavelength-selective retroreflector is transparent, and the color or image underlying it can be seen therethrough. The retroreflector, therefore, has an effect on the appearance of the place where it is installed. Accordingly, it can be installed also in a place where importance is put on design or aesthetic sense. In addition, the retroreflector does not prevent light from passing therethrough. Therefore, even when it is disposed on a lighting indicator or another type of indicator, it does not affect the performance of the indicator. Some exemplary places where transparent wavelength-selective retroreflectors may be mounted include automotive bodies, signboards, and the like.

The following examples further illustrate the present invention. These Examples, however, should not to be construed as limiting the scope of the application to the details of the Examples.

EXAMPLE 1

A sheet having a structure including plural cube-corner type cavities (similar to the sheet shown in FIG. 2, such as a reflective board "E39-R1" manufactured by Omron Co., Ltd. having a cube-corner type cavity side length of about 1.5 mm) was prepared. A wavelength-selective multilayered reflective film ("SRF 1200" manufactured by 3M Co., Ltd.) having a reflectance of at least 50% for light having a wavelength of between about 940 nm and about 1100 nm was also prepared.

The sheet was cut to a size of 3 cm×5 cm to form an optical structure layer. The wavelength-selective multilayered reflective film was cut into isosceles right-angled triangles having legs that were each 1.5 mm long. These triangular pieces were adhered with an acrylic adhesive agent one by one to the concave surface of the cube-corner type cavities of the optical structure layer. Thus, a transparent wavelength-selective retroreflector was obtained.

EXAMPLE 2

Polycarbonate resins were injection molded, and a cube-corner type retroreflective sheet having a full cube-corner type retroreflective structure (similar to the sheet shown in FIG. 5; having a cube-corner trigonal pyramid type side length of about 1.5 mm) was prepared. A reflective coating (dielectric multilayered coating) was deposited on the concave-convex surface of the retroreflective structure so as to have a reflectance of at least 60% over the wavelength range of 850 nm±30 nm at an incident angle of 55 degrees. Thus, a transparent wavelength-selective retroreflector was obtained.

Using silicon dioxide and titanium oxide as materials of the reflective coating, twenty layers were formed alternately by deposition so as to include quarter wave layers each having a product (n×d) of the thickness (d, in nm) and the refractive index (n) of the material of the cube-corner equal to a quarter the wavelength of the light reflected.

EXAMPLE 3

Figure 6:
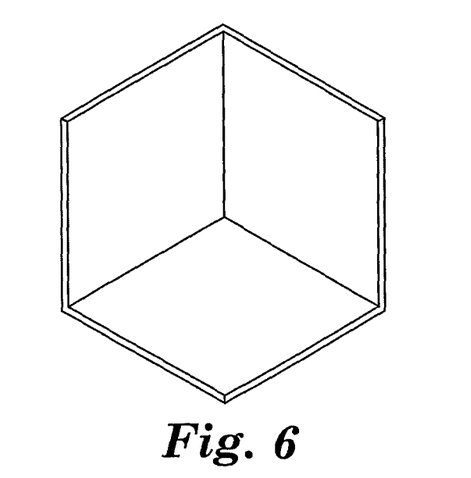
FIG. 6 is a perspective view showing another embodiment of a transparent, wavelength-selective retroreflector.

A full cube-corner shape (similar to that shown in FIG. 6) having a uniform thickness of 1.0 mm and having side lengths of 30 mm was prepared. A PET film deposited with an ITO was prepared, and was cut into three square pieces each of which had side lengths of 29 mm. The cut pieces were adhered to the inner surfaces of the full cube-corner shape using an acrylic adhesive agent so that the ITO deposited surfaces of the pieces faced the inner surfaces. In this way, a transparent wavelength-selective retroreflector was formed.

EXAMPLE 4

The cube-corner type retroreflective sheet of Example 2 (on which the multi-layered film had not been deposited) was injection molded and cut into two pieces each having a size of 3 cm×5 cm. The optical structure layer and the light-transmissible resin layer had the same size. The reflective film was deposited onto the optical structure layer in the same manner as described in Example 2. The concave-convex surface of the light-transmissible resin layer faced the concave-convex surface of the optical structure layer, and they were adhered with an acrylic adhesive agent so that there was little to no space therebetween. In this way, a transparent wavelength-selective retroreflector having flat front and rear surfaces was formed.

EXAMPLE 5

A full cube-corner shape (similar to that shown in FIG. 6) having a uniform thickness of 1.0 mm and side lengths of 30 mm was prepared via injection molding. The wavelength-selective multilayered reflective film was cut into three square pieces having 29 mm side lengths. A transparent wavelength-selective retroreflector was formed by adhering the cut pieces to the inner surfaces of the full cube-corner shape with an acrylic adhesive agent.

COMPARATIVE EXAMPLE 1

The cube-corner type retroreflective sheet used in Example 1 was cut into two pieces each of which had a size of 3 cm×5 cm to form an optical structure layer and a light transmissible resin layer of the same size. Then, the two pieces of sheeting were placed together with the concave-convex surface of the retroreflective structure and the concave-convex surface of the light transmissible resin layer facing each other. The two pieces of sheeting were fixed in this position so as to leave therebetween a space (air layer) having a thickness of about 0.05 mm. Thus, a retroreflector was obtained.

COMPARATIVE EXAMPLE 2

The cube-corner type retroreflective sheet used in Example 1 was cut into two pieces each of which had a size of 3 cm×5 cm to form an optical structure layer and a light transmissible resin layer of the same size. Glycerol was applied to the concave-convex surface of the full cube-corner type retroreflective structure of the optical structure layer. The concave-convex surface of the retroreflective structure and the concave-convex surface of the light transmissible resin layer were positioned to face one another. Then, the two pieces of sheeting were fixed so as to form therebetween a glycerol layer having a thickness of about 0.05 mm. Thus, a retroreflector was obtained.

Performance Evaluation

The transparency and retroreflectivity of the transparent wavelength-selective retroreflectors obtained in the Examples and the Comparative Examples were evaluated in the manner described below. The results are shown in Tables 1, 2A, and 2B.

1. Transparency

A sheet having a red logo "3M" of a size about 3 cm×5 cm on a white background was prepared. A transparent wavelength-selective retroreflector was placed on the logo and then the visibility of the letters and the color was evaluated. The results are shown in Table 1.

2. Infrared Retroreflectivity

Retroreflectively photographing using infrared light was conducted at incident angles of 0 degree, ±15 degrees, ±30 degrees and ±45 degrees. In this way, the presence of retroreflectivity was evaluated. The results of these evaluations are shown in Table 2.

A camera "MODEL DCR-PC100" manufactured by Sony Corp. was used for the photographing. A filter that transmits light of wavelengths 850 nm or greater was attached to the lens of the camera. Photographs were taken in night shot mode, which is a photographing mode where infrared light is provided at an object and the shape or the like of the object is recognized on the basis of the light reflected. This camera had an LED having a peak at 800 nm as an infrared light source.

In Example 3, photographing was conducted by using an infrared camera "IR210" manufactured by Uhan Guide Infrared Technology Corp. This camera has a sensitive wavelength range of from about 8 to about 14 µm, and the average emission rate is in the wavelength range of from about 2 µm to about 14 µm and is about 0.85. As a light sauce, an infrared heater "HILEX HEATER HHS 1103" manufactured by Hakko Denki Seisakusho K.K. was used.

TABLE 1

| Example No. | Whether the color can be seen or not | Whether the logo can be seen or not |
| --- | --- | --- |
| 1 | Yes | Yes |
| 2 | Yes | Yes |
| 3 | Yes | Yes |
| 4 | Yes | Yes |
| 5 | Yes | Yes |
| Comparative 1 | No | No |
| Comparative 2 | Yes | Yes |

TABLE 2A

| | Infrared Retroreflectivity | | | | | | |
| --- | --- | --- | --- | --- | --- | --- | --- |
| Example No. | −30 | −20 | −10 | 0 | +10 | +20 | +30 |
| 1 | Yes | Yes | Yes | Yes | Yes | Yes | Yes |
| 2 | Yes | Yes | Yes | Yes | Yes | Yes | Yes |

TABLE 2A-continued

| | Infrared Retroreflectivity | | | | | | |
|---|---|---|---|---|---|---|---|
| Example No. | −30 | −20 | −10 | 0 | +10 | +20 | +30 |
| 3 | Yes | Yes | Yes | Yes | Yes | Yes | Yes |
| 4 | Yes | Yes | Yes | Yes | Yes | Yes | Yes |
| 5 | Yes | Yes | Yes | Yes | Yes | Yes | Yes |
| Comparative 1 | Yes | Yes | Yes | Yes | Yes | Yes | Yes |
| Comparative 2 | No | No | No | No | No | No | No |

TABLE 2B

| | Infrared Retroreflectivity | | | | | | |
|---|---|---|---|---|---|---|---|
| Example No. | −30 | −20 | −10 | 0 | +10 | +20 | +30 |
| 1 | No | No | No | No | No | No | No |
| 2 | No | No | No | No | No | No | No |
| 3 | No | No | No | No | No | No | No |
| 4 | No | No | No | No | No | No | No |
| 5 | Yes | Yes | Yes | Yes | Yes | Yes | Yes |
| Comparative 1 | No | No | No | No | No | No | No |
| Comparative 2 | | | | | | | |

What is claimed is:

1. A transparent wavelength-selective retroreflector that retroreflects light within a specific wavelength range and through which visible light may pass, comprising:
an optical structure layer made of a light transmissible material and having a first major surface and a second major surface; and
a cube corner structure disposed on one of the first or second major surfaces; and wherein the specific wavelength range is between about 750 nm and about 15000 nm.

2. The transparent wavelength-selective retroreflector of claim 1, wherein the specific wavelength range is between about 110 nm and about 400 nm.

3. The transparent wavelength-selective retroreflector of claim 1, wherein the cube corner structure includes at least one of cube-corner type trigonal pyramids, cube-corner type cavities, cube-corner type trigonal pyramids with reflective layers, and cube-corner type cavities with reflective layers.

4. A transparent wavelength-selective retroreflector comprising:
an optical structure layer made of a light transmissible material and including a front surface having multiple cube-corner type structures and a substantially flat rear surface; and
a wavelength-selective reflective layer disposed on the front surface of the optical structure layer, the wavelength-selective reflective layer being transparent to visible light and selectively reflecting light within a wavelength range that differs from the visible light wavelength range.

5. The transparent wavelength-selective retroreflector of claim 4, wherein the multiple cube-corner type structures includes structures selected from a group consisting essentially of cube-corner type trigonal pyramids and cube-corner type cavities, and wherein adjacent cub-corners type structures are arranged on a base surface of the optical structure layer in a concaveconvex relationship.

6. The transparent wavelength-selective retroreflector of claim 5, wherein one cube-corner type trigonal pyramid and three cube-corner type cavities adjacent thereto together form a full cube-corner.

7. The transparent wavelength-selective retroreflector of claim 4, wherein the wavelength range is between about 750 nm and about 15000 nm.

8. A transparent wavelength-selective retroreflector comprising:
an optical structure layer made of a light transmissible material, the optical structure layer having a substantially flat front surface and a rear surface having a cube-corner type retroreflective structure;
a wavelength-selective reflective layer having a first major surface and a second major surface, the first major surface disposed on the front surface of the optical structure layer; the wavelength-selective reflective layer being transparent to visible light and selectively reflecting light within a wavelength range other than the wavelength range of visible light; and
a light-transmissible resin layer disposed on the second major surface of the wavelength-selective reflective layer.

9. The transparent wavelength-selective retroreflector of claim 8, wherein the structure comprising multiple cube-corner type cavities includes multiple cube-corner type trigonal pyramids and multiple cube-corner type cavities, and wherein adjacent cube-corners type cavities are arranged on a base surface in a concave-convex relationship.

10. The transparent wavelength-selective retroreflector of claim 8, wherein the wavelength range is between about 750 nm and about 15000 nm.

11. The transparent wavelength-selective retroreflector of claim 8, wherein one cube-corner type trigonal pyramid and three cube-corner type cavities adjacent thereto form a full cube-corner.

12. A transparent wavelength-selective retroreflector, comprising:
a light-transmissible plate-like substrate having a uniform thickness and a shape that causes the substrate to exhibit retroreflectivity; and
a wavelength-selective reflective layer that is transparent to visible light and that selectively reflects light within a specific wavelength range other than the wavelength range of visible light, the wavelength-selective reflective layer disposed on a front surface or a rear surface of the plate-like substrate.

13. The transparent wavelength-selective retroreflector of claim 12, wherein the wavelength-selective reflective layer reflects infrared light.

* * * * *

UNITED STATES PATENT AND TRADEMARK OFFICE
CERTIFICATE OF CORRECTION

PATENT NO. : 8,496,339 B2
APPLICATION NO. : 11/993331
DATED : July 30, 2013
INVENTOR(S) : Toshitaka Nakajima Page 1 of 1

It is certified that error appears in the above-identified patent and that said Letters Patent is hereby corrected as shown below:

In the Specifications

<u>Column 9</u>

Line 42, delete "benophenone," and insert -- benzophenone, --, therefor.

<u>Column 9</u>

Line 43, delete "benophenone," and insert -- benzophenone, --, therefor.

In the Claims

<u>Column 14</u>

Line 4, in Claim 5, delete "concaveconvex" and insert -- concave-convex --, therefor.

Signed and Sealed this
Twenty-fourth Day of December, 2013

Margaret A. Focarino
*Commissioner for Patents of the United States Patent and Trademark Office*